July 4, 1950  E. RUBIN  2,514,094

CHILD'S SERVING DISH

Filed March 4, 1948

INVENTOR.
ELIZABETH RUBIN

BY

ATTORNEY.

Patented July 4, 1950

2,514,094

UNITED STATES PATENT OFFICE 2,514,094

CHILD'S SERVING DISH

Elizabeth Rubin, New York, N. Y.

Application March 4, 1948, Serial No. 13,051

1 Claim. (Cl. 65—15)

This invention relates to new and useful improvements in serving dishes for small children, and it has for its object to provide a device, which will embody fascinating features, highly interesting to a child, and which at the same time will be of a construction adapted to facilitate the use of same, permitting an easy dismantling of the device for cleaning purposes, and also permitting the food in the serving dish to keep warm by submitting it to a heating effect by means of water suitably arranged relatively to said serving dish.

The fascinating features referred to may consist in picturesque scenes, individual pictures, numbers, or the like, which are arranged, for instance, by painting these on a disk that may be seen through a window, or windows, in the bottom of the service dish as said disk is rotated.

It is believed that this picture display may serve as a strong inducement to the child to consume the contents of the dish in order to get a chance to see said pictures.

The said device may be made of any suitable material, and of any convenient shape.

With the above and other objects in view, this invention consists of the novel features of construction, combination and arrangement of parts, hereinafter fully described, claimed and illustrated in the accompanying drawings forming part of this application, and in which similar characters of reference indicate corresponding parts in all views, and in which:

Figure 1:
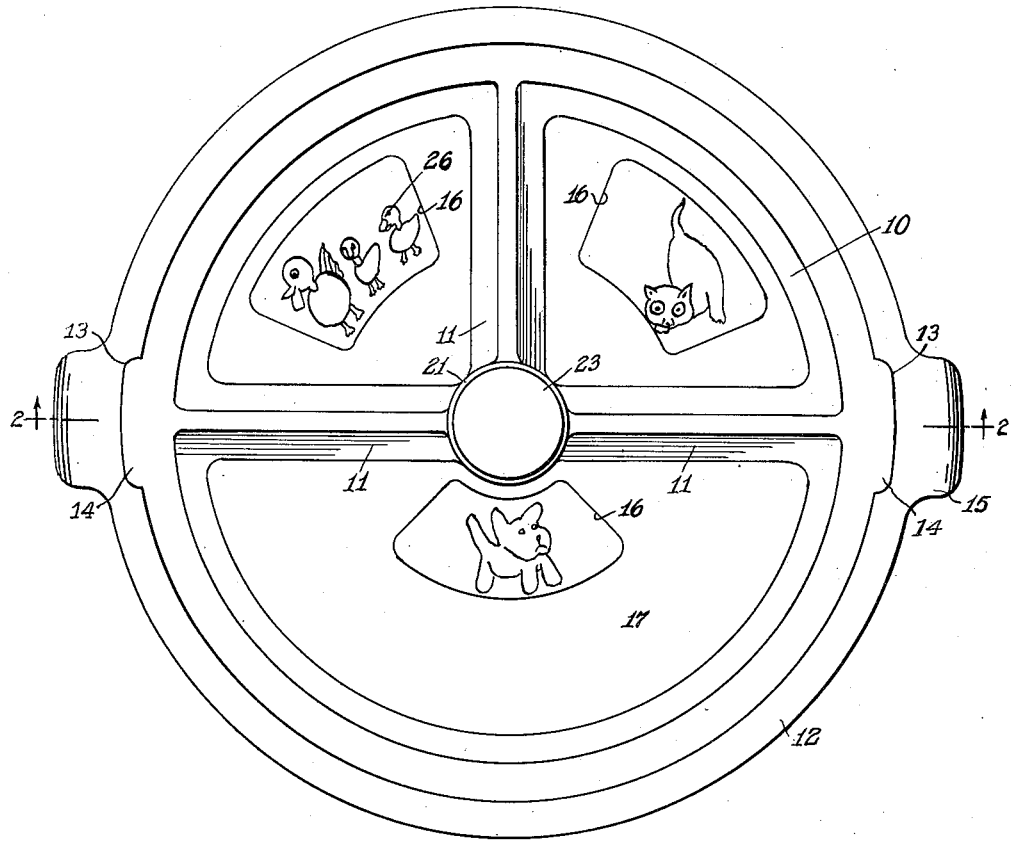
Figure 1 is a top plan view of my device.
Figure 2:
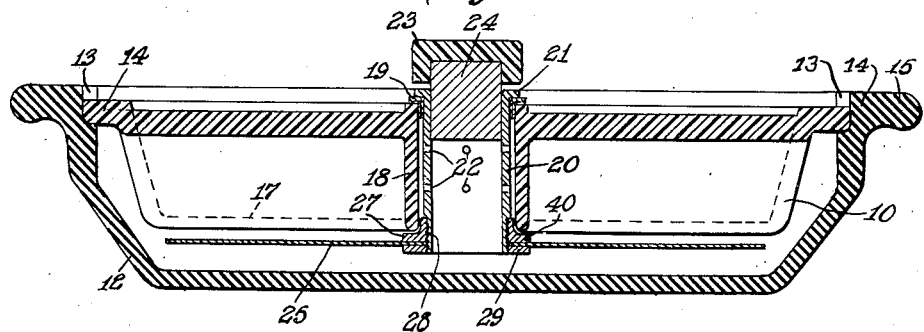
Figure 2 is a section taken on the line 2—2 in Figure 1.

Referring more particularly to the drawings, the numeral 10 indicates a preferably round serving dish, which may if desired be made with a number of partitions 11 radially disposed therein and integral therewith. A basin 12 of flexible material is formed with a recess 13 in its handle portion 15.

The dish 10 is detachably positioned in said basin 12 as a corresponding handle 14 of the former is snapped into the recess 13 of the latter.

Instead of the respective handles 14 and 15, the basin 12 may have the recess 13 extending all around its periphery, while the service dish 10 may be surrounded with a corresponding edge adapted to snap into said recess.

The dish 10 is preferably of glass, which is painted upon its outer side in such a manner as to have transparent spaces or windows 16 in the bottom 17 thereof through which pictures 26, or the like, painted on a reversible disk 25 positioned underneath said bottom, may be seen, as indicated in Figure 1.

The serving dish is made with a central tubular opening 18 therein.

A shouldered bushing 19 is inserted in the upper end of the tubular opening 18, and cemented to the wall of the latter; or said bushing may be formed into one tubular member extending the whole length of the tubular opening 18.

A torque tube 20 formed with vent holes 22 is turnably inserted in the tubular opening 18, as the upper flange 21 of said torque tube rests upon the shouldered bushing 19. A cap 23, has a stopper 24 which fits the torque tube 20 and is adapted to rotate the latter and, in turn, a disk 25 which may be reversible and which is secured to the lower end of said torque tube; said disk is provided with pictures 26 thereon, which may be seen through the bottom windows 16 when the food in the serving dish has been wholly or partially consumed.

A bushing 40 is loosely placed on the lower end of the torque tube 20, said bushing has a shoulder 27 adapted to give clearance to the disk 25 which, by means of an opening 28 therein, is mounted upon said shoulder 27 and the torque tube 20; a washer 29 is next threaded upon the lower end of the torque tube so as to hold said parts securely together.

If desired, warm water may be placed in the basin 12, for instance by means of the hollow torque tube 20.

It is obvious that changes may be made in the form, construction and arrangement of the several parts, as shown, within the scope of the appended claim, without departing from the spirit of the invention, and I do not, therefore, wish to limit myself to the exact construction shown and described herein.

What I claim as new, and desire to secure by Letters Patent of the United States, is:

A serving dish comprising a bowl having a flat bottom, partitions arranged in said bowl and integral with the latter, handle-portions oppositely formed upon each side of the bowl, a basin adapted to receive said bowl, said basin having opposite recesses in its inner side adapted to receive said handle-portions, said serving dish having a central tubular opening therein, a shoulder member disposed in the upper end of said tubular opening, a torque tube formed with perforations therein and being turnably inserted in said tubular opening, a cap, a stopper mounted in said cap and engaging said torque tube, whereby to rotate the latter, a bushing arranged at the lower end of the torque tube, a shoulder formed on said bushing, a disk having a central opening therein, and being mounted on said shoulder, and a washer threaded upon the lower end of the torque tube, whereby to secure the disk to the latter; the bottom of said serving dish having transparent sections therein, said disk being provided with pictures adapted to be viewed through said transparent sections.

ELIZABETH RUBIN.

REFERENCES CITED

The following references are of record in the file of this patent:

UNITED STATES PATENTS

| Number | Name | Date |
| --- | --- | --- |
| Re. 2,860 | Ames | Feb. 11, 1868 |
| 357,689 | Porrera | Feb. 15, 1887 |
| 541,361 | Kennison | June 18, 1895 |
| 657,834 | Ruttman | Sept. 11, 1900 |
| 697,907 | Wilder, Jr. | Apr. 15, 1902 |
| 1,058,445 | Lessing | Apr. 8, 1913 |
| 1,829,861 | Holt | Nov. 3, 1931 |
| 2,200,696 | L'Heureux | May 14, 1940 |
| 2,322,665 | Ryan | June 22, 1943 |
| 2,329,279 | Lower | Sept. 14, 1943 |
| 2,332,173 | Shaffer | Oct. 19, 1943 |